E. A. JOHNSTON & C. I. LONGENECKER.
POWER TRANSMITTING GEAR MECHANISM.
APPLICATION FILED JUNE 30, 1910.
1,004,880.
Patented Oct. 3, 1911.
3 SHEETS—SHEET 2.
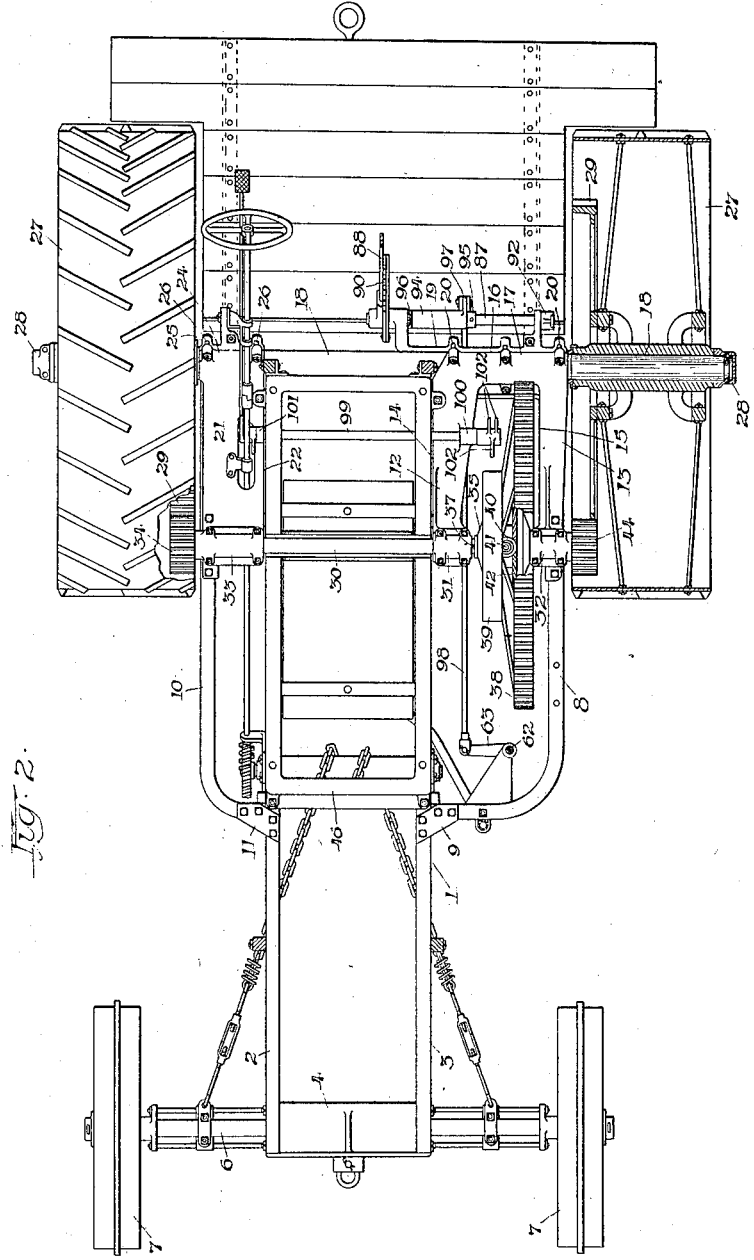
Witnesses:
F. W. Hofmeister
Inventors
Edward A. Johnston
and
Charles I. Longenecker
By E. W. Burgess
Attorney E. A. JOHNSTON & C. I. LONGENECKER.
POWER TRANSMITTING GEAR MECHANISM.
APPLICATION FILED JUNE 30, 1910.
1,004,880.
Patented Oct. 3, 1911.
3 SHEETS—SHEET 3.
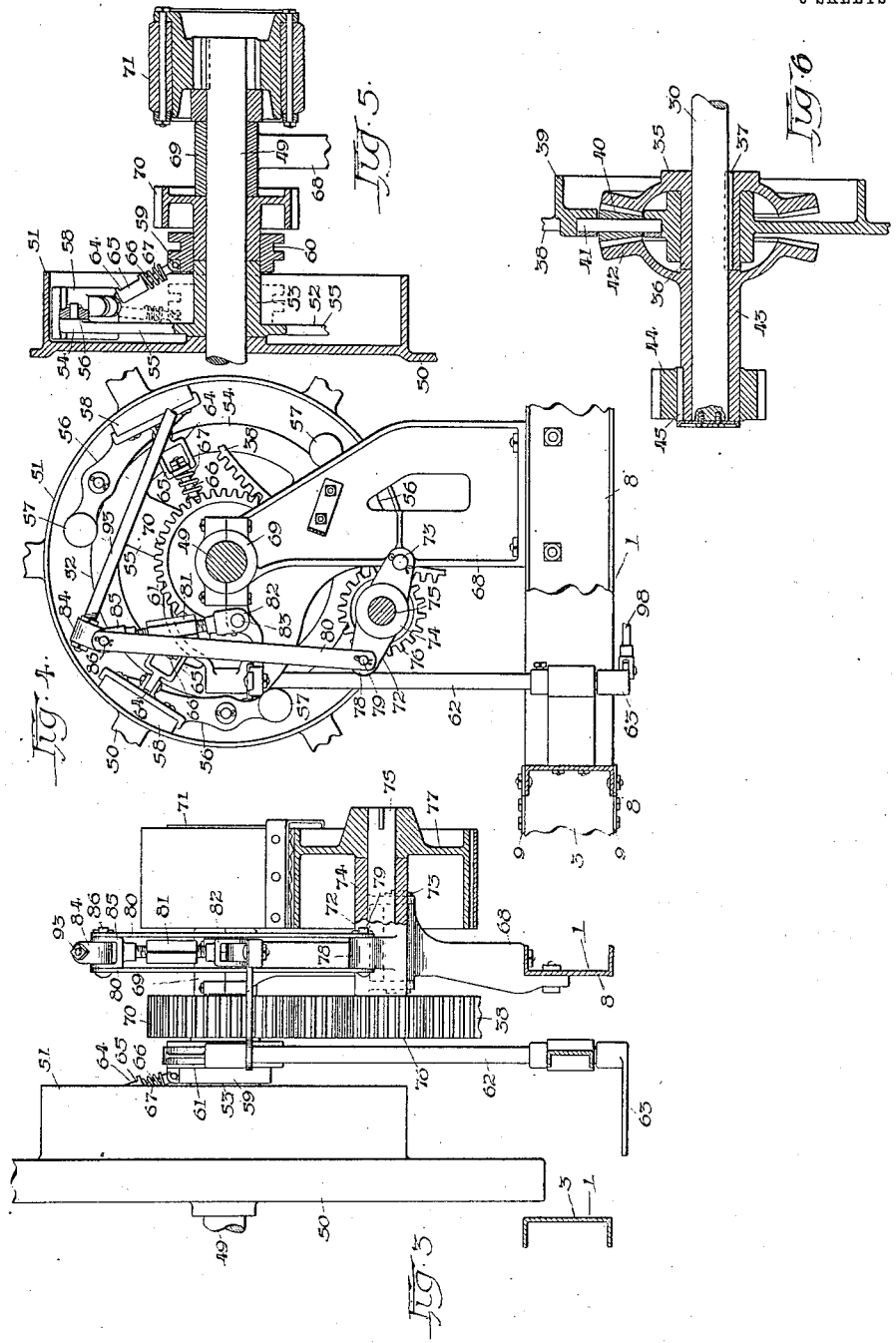
Witnesses:
F. W. Hoffmeister
Inventors.
Edward A. Johnston
and
Charles I. Longenecker
By E. W. Burgess
Attorney

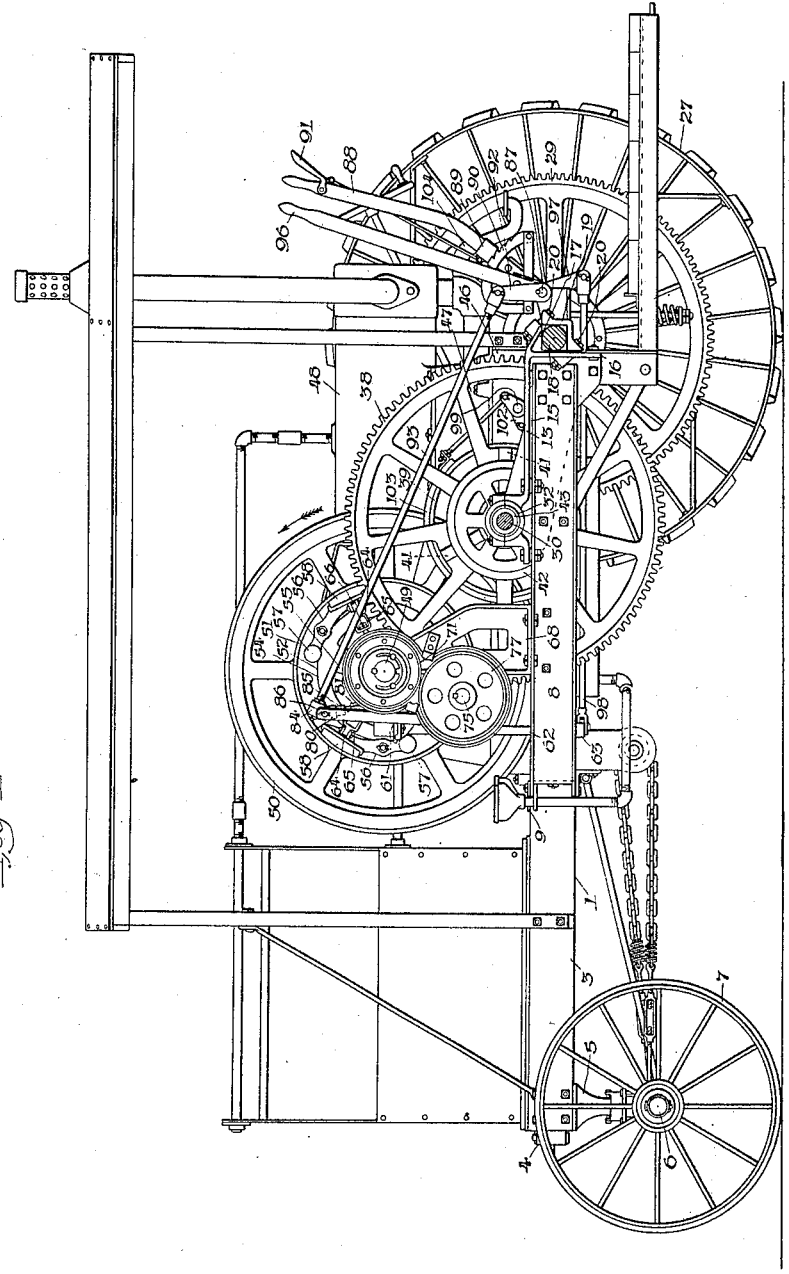

UNITED STATES PATENT OFFICE.

EDWARD A. JOHNSTON AND CHARLES I. LONGENECKER, OF CHICAGO, ILLINOIS, ASSIGNORS TO INTERNATIONAL HARVESTER COMPANY, A CORPORATION OF NEW JERSEY.

POWER-TRANSMITTING GEAR MECHANISM.

1,004,880.                    Specification of Letters Patent.         Patented Oct. 3, 1911.

Application filed June 30, 1910.   Serial No. 569,639.

*To all whom it may concern:*

Be it known that we, EDWARD A. JOHNSTON and CHARLES I. LONGENECKER, citizens of the United States, residing at Chicago, county of Cook, and State of Illinois, have invented certain new and useful Improvements in Power-Transmitting Gear Mechanism, of which the following is a specification.

Our invention relates to power transmitting gear mechanism for use in connection with traction engines, and in particular to the construction and mounting of the transmission gears and other specific details of our invention, the object being to provide a construction that is both strong and simple and one that will be durable and efficient in operation. We attain these objects by means of the mechanism illustrated in the accompanying drawings, in which—

Figure 1 is a side elevation of a traction engine having our invention forming a part thereof; Fig. 2 is a top plan view of Fig. 1, partly in section, with the engine removed; Fig. 3 is a detached detail showing the manner of transmitting motion from the engine shaft to other operative parts of the machine; Fig. 4 is a side elevation, partly in section, of Fig. 3; Fig. 5 is a detached detail showing part of the engine shaft and the manner of mounting the clutch mechanism thereon; Fig. 6 is a detail in section of the differential gear mechanism.

The same reference characters designate like parts throughout the several views.

1 represents the truck frame, including two longitudinally arranged right and left-hand main sill members 2 and 3, connected at their forward ends by means of a transverse bolster member 4, that is provided with a depending arm 5, having its lower end flexibly connected with a front axle 6, and 7 represents steering and carrying wheels journaled upon opposite ends of said axle.

8 represents a supplemental sill member upon the left-hand side of the frame, having its body portion parallel with the main sills and its forward end curved inward and connected to sill member 3 intermediate its ends by means of joint plates 9 secured to the upper and lower sides of the sill members. 10 represents a similar supplemental sill arranged upon the right-hand side of the frame and having its front end turned inward and connected with sill 2 by means of joint plates 11 secured to the upper and lower sides of the sill members. The sills 3 and 8 are connected at their rear ends by means of a cast frame member having forwardly projecting arms 12 and 13 that are provided with depending flanges 14 and 15, to which are secured the sill members 3 and 8, respectively, and a transversely arranged rear portion 16, having an angular channel 17 adapted to receive the rear axle member 18, having its body portion preferably square in cross section, and is secured in position by means of a cap 19 and bolts 20. The sill members 2 and 10 are connected at their rear ends by means of a longitudinally arranged cast member 21, having depending flanges 22 and 23, to which are secured the sills 2 and 10, respectively. An angular channel 24, similar in form to that of 17, upon the opposite side of the truck frame, is arranged across the rear end of member 21 in a manner to receive the opposite end of the axle 18, which is secured therein by means of a cap 25 and bolts 26. The axle is provided with spindle portions at opposite ends thereof, upon which are journaled traction and carrying wheels 27, that are retained thereon by means of caps 28.

29 represents spur gear members secured to the inner ends of the hubs of the traction wheels, and 30 represents a cross shaft journaled in bearings 31 and 32 at the front ends of arms 12 and 13, respectively, and bearing 33 at the front end of the frame member 21.

34 represents a pinion secured to the cross shaft at the outer end of bearing 33 and meshing with one of the spur gear members 29.

35 represents a bevel gear wheel having a sleeve portion 36 that is secured to the cross shaft by means of a key 37.

38 represents a spur gear member journaled upon the sleeve 36 and having a laterally extending rim portion 39, and 40 represents a series of bevel pinions journaled upon radially arranged pins 41 carried by said spur gear member, said pinions meshing with the bevel gear wheel 35 upon one side thereof and with a bevel wheel 42 upon the opposite side, the latter wheel being provided with a sleeve portion 43 that is free to turn upon the shaft 30.

44 represents a pinion secured to the sleeve at the outer end of bearing 32 by means of a key 45, the pinion meshing with the spur gear secured to the traction wheel upon that side of the truck, the mechanism being operative as a differential driving connection between the spur gear 38 and the traction wheels.

46 represents a truck frame member secured to sills 2 and 3 and adapted to form a sub-base, upon which is mounted the base portion 47, forming part of an explosive engine, including a power cylinder 48, crank shaft 49 and fly wheels 50 secured to opposite ends of the crank shaft. The fly wheel upon the left-hand side of the truck is provided with a laterally projecting rim portion 51 upon its outer side, and 52 represents a clutch member having a hub portion 53 journaled upon the engine shaft, and a rim portion 54 connected with the hub by means of arms 55.

56 represents levers pivotally mounted intermediate their ends upon the rim 54, having counterweights 57 at one end thereof and friction shoes 58 at their opposite ends.

59 represents a clutch controlling sleeve slidably mounted upon hub portion 53, having a circumferential groove 60 in its periphery that is adapted to receive a clutch shipping fork 61, secured to the upper end of a vertically arranged rock shaft 62 that is provided with a crank arm 63 at its lower end. The sleeve 59 is connected with the levers 56 by means of yielding toggle links 64, having their inner ends pivotally connected with the sleeve and their outer ends with said levers. The links include socket members 65 that slidably receive plungers 66 that carry compression springs 67 operative to extend the links in a manner to yieldingly hold the friction shoes in contact with rim 51 when the clutch controlling sleeve is moved in one direction.

68 represents a vertically arranged standard secured at its lower end to the supplemental sill 8, and having at its upper end a bearing 69 to receive the outer end of the engine crank shaft, and 70 represents a pinion journaled upon said shaft between the bearing and the inner end of the hub 53 of clutch member 52, the hub of the pinion engaging with the hub of the clutch member in a manner to be driven thereby, the pinion meshing with the spur gear member 38. Secured to the overhanging end of the engine crank shaft is a friction wheel 71.

72 represents a yoke pivotally connected with standard 68 by means of a pin 73, and provided with a sleeve portion 74, in which is journaled a shaft 75, upon the inner end of which shaft is secured the pinion 76, meshing with spur gear member 38. 77 represents a friction wheel secured to the opposite end of the shaft and adapted to engage with friction wheel 71.

78 represents a forwardly projecting ear forming part of the yoke 72, and 79 represents a pin connecting the lower ends of links 80 therewith.

81 represents a longitudinally adjustable toggle member having its lower end pivotally connected with standard 68 by means of a clevis member 82 and pin 83, and its upper end with a block 84 by a similar clevis 85 and pin 86, the upper ends of the links 80 being also connected with the block upon opposite sides of the clevis by means of the same pin.

Journaled in bearings carried by the cap 19 is a transverse rock shaft 87, having secured to its inner end a hand lever 88 provided with a common form of spring pressed detent 89 adapted to engage with a notched sector 90 in a manner to secure the lever in any desired position of adjustment, and 91 represents the usual thumb lever for controlling the movement of the detent. Upon the opposite end of the shaft is a lever arm 92 that is connected with the block 84 by means of a rod 93 whereby the toggle member 81 may be swung about its pivot and, through its connection with yoke 72, cause the latter to rise or fall in a manner to cause friction wheel 77 to engage with or be disengaged from the friction wheel 71.

94 represents a sleeve mounted upon shaft 87 in a manner to turn thereon and held against longitudinal movement by means of a collar 95.

96 represents a hand lever secured to the inner end of the sleeve, and 97 an arm integral therewith at its opposite end, the arm being connected with crank arm 63 at the lower end of the vertical shaft 62 by means of a rod 98.

99 represents a rock shaft journaled in bearings 100 and 101 carried by frame members 12 and 21, respectively, and provided at one end with oppositely disposed arms 102 that are connected with opposite ends of a band brake member 103 encircling the rim portion 39 of the spur gear 38 and at its opposite end with a rearwardly extending foot lever 104 whereby the operator may manipulate the brake mechanism in a convenient and efficient manner.

In operation, the engine shaft rotates in the direction of the arrow (Fig. 1), and when it is desired to move the tractor in a forward direction the operator throws the hand lever 96 rearward sufficient to cause the clutch shipping fork to slide the clutch controlling sleeve 59 toward the fly wheel in a manner to cause the toggle members connected therewith to move the friction shoes in contact with the friction rim forming part of the fly wheel, said toggle members being moved to a self-retaining position at the opposite side of a vertical plane, as shown by dotted lines in Fig. 5, and then the pinion 70 will be caused to rotate with the hub 53 and transmit motion in a forward direction to the traction wheels through its gear connection therewith. To give motion in a reverse direction to the traction wheels the clutch mechanism is thrown out of engagement and hand lever 88 thrown rearward, as before described, which, through its toggle connection with yoke 72, causes the friction wheel 77 to engage with friction wheel 71, and pinion 76, through its driving connection with spur gear member 38, transmits motion thereto in an opposite direction.

What we claim as our invention, and desire to secure by Letters Patent, is:

1. A power transmitting gear mechanism including, in combination, a gear supporting frame, a primary power transmitting shaft carried by said frame, a pinion loosely mounted upon said shaft, a secondary power transmitting shaft carried by said frame and a gear wheel secured thereto, said gear wheel engaging with said pinion in a manner to be driven thereby in one direction, a clutch member secured to and rotatable with said primary shaft, a clutch member loosely mounted upon said primary shaft and having a driving connection with said pinion, means for controlling the engagement of said clutch members, a friction wheel secured to said primary shaft, a movable countershaft carried by said frame, a friction pulley secured to one end of said countershaft and adapted to engage with said friction wheel, a pinion secured to the opposite end of said countershaft and engaging with the gear wheel upon said secondary shaft and adapted to rotate said shaft in a reverse direction, and means for moving said countershaft in a manner to cause said friction pulley to contact with said friction wheel.

2. A power transmitting gear mechanism including, in combination, a gear supporting frame, a primary power transmitting shaft carried by said frame, a pinion loosely mounted upon said shaft, a secondary power transmitting shaft carried by said frame and a gear wheel secured thereto, said gear wheel engaging with said pinion in a manner to be driven thereby in one direction, a clutch member secured to and rotatable with said primary shaft, a clutch member loosely mounted upon said primary shaft and having a driving connection with said pinion, means for controlling the engagement of said clutch members, a friction wheel secured to said primary shaft, a swinging yoke pivotally connected with said frame, a countershaft journaled in said yoke, a friction pulley secured to one end of said countershaft and adapted to contact with said friction wheel, a pinion secured to the opposite end of said countershaft and meshing with the gear wheel upon said secondary shaft, and means operative to swing said yoke in a manner to cause said friction pulley to engage with said friction wheel and to rotate said secondary shaft in a reverse direction.

3. A power transmitting gear mechanism including, in combination, a gear supporting frame, a primary power transmitting shaft carried by said frame, a pinion loosely mounted upon said shaft, a secondary power transmitting shaft carried by said frame and a gear wheel secured thereto, said gear wheel engaging with said pinion in a manner to be driven thereby in one direction, a clutch member secured to and rotatable with said primary shaft, a clutch member loosely mounted upon said primary shaft and having a driving connection with said pinion, means for controlling the engagement of said clutch members, a vertically arranged standard forming part of said gear supporting frame, having a bearing at its upper end in which is journaled said primary shaft, a yoke pivotally connected with said standard, a countershaft journaled in said yoke, a friction wheel secured to said primary shaft, a friction pulley secured to one end of said countershaft and adapted to contact with said friction wheel, a pinion secured to the opposite end of said countershaft and meshing with the gear wheel upon said secondary shaft, and means operative to swing said yoke in a manner to cause said friction pulley to engage with said friction wheel and to rotate said secondary shaft in a reverse direction, said means including a swinging toggle member having its lower end pivotally connected with said standard and its opposite end having a link connection with said yoke.

EDWARD A. JOHNSTON.
CHARLES I. LONGENECKER.

Witnesses:
A. A. JONES,
L. HOUSTON.